Oct. 31, 1944.  H. V. WILLIAMSON  2,361,440
LIQUID LEVEL GAUGE
Filed Nov. 19, 1942   2 Sheets-Sheet 2
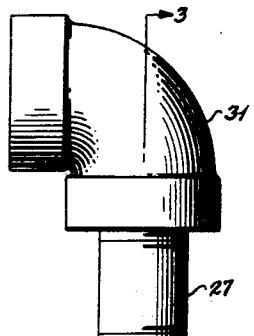
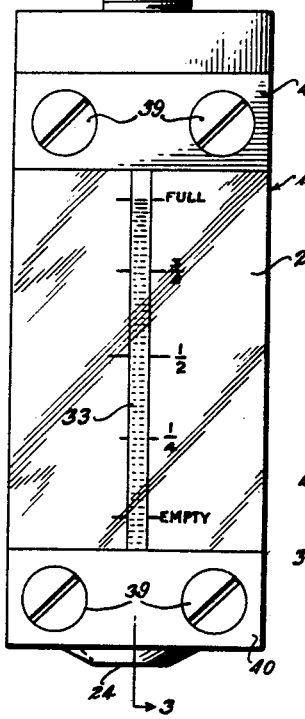
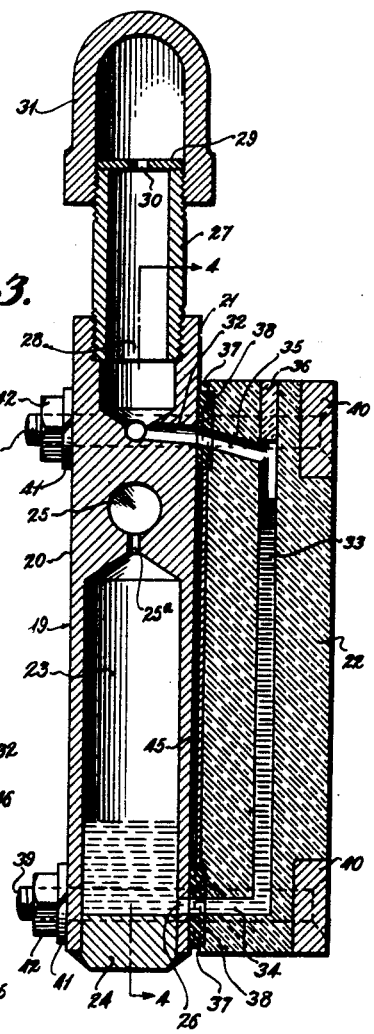
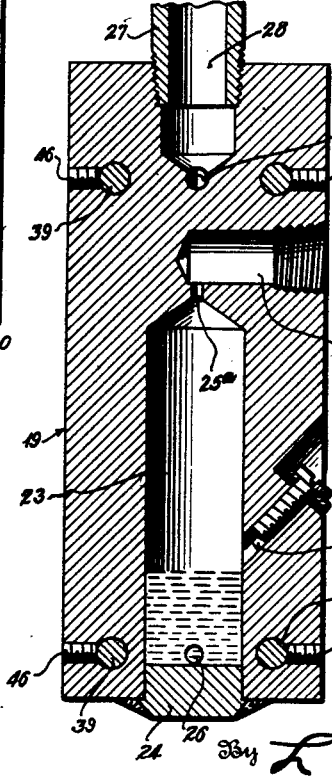
Inventor
Hilding V. Williamson
By L. Powell Myers
Attorney

UNITED STATES PATENT OFFICE 2,361,440

LIQUID LEVEL GAUGE

Hilding V. Williamson, Chicago, Ill., assignor, by mesne assignments, to Reconstruction Finance Corporation, Chicago, Ill., a corporation of the United States Application November 19, 1942, Serial No. 466,171

20 Claims. (Cl. 73—299)

The present invention relates to liquid level gauges which are particularly adapted for use with the containers or vessels employed for transporting and storing liquids, such as carbon dioxide, that develop high vapor pressures when confined at normal temperatures.

Within the last few years there has been developed and commercially exploited a method for transporting and storing liquid carbon dioxide which involves the use of large capacity, insulated tanks in which the liquid is confined and maintained at a desired, constant subatmospheric temperature, and its corresponding vapor pressure, by means of suitable refrigerating mechanism. The capacities of tanks of this character which are now in use vary from one-quarter ton to one hundred and twenty-five tons. Prior to this innovation, liquid carbon dioxide has always been transported and stored in what are known as high pressure cylinders. The larger sized cylinders are capable of holding either fifty pounds or seventy pounds of carbon dioxide.

When liquid carbon dioxide is to be stored for any appreciable length of time in high pressure cylinders, the only practical way of determining whether there has been any loss of the liquefiable gas, as a result of leakage, is to weigh each cylinder. This is an extremely troublesome and time consuming operation when the cylinders are employed as a source of supply of carbon dioxide in a system which involves fixed piping to which the cylinders are connected and arranged in a practical, space conserving bank.

One of the numerous advantages which can be obtained by storing and transporting liquid carbon dioxide in bulk by means of large capacity vessels or containers is the ability to determine at all times, and without need for disturbing the vessel or any of its connections, the quantity of liquid that remains in the vessel by measuring the level of the liquid. As the liquid is maintained at a constant temperature during its entire period of confinement, the ratio of the liquid content of the vessel to the vapor content will remain constant. Therefore, the level of the liquid provides a medium or factor that can be employed for accurately measuring the contents of a vessel. It will be appreciated that the liquid level does not remain constant in vessels in which carbon dioxide is confined and subjected to the fluctuating temperatures of the surrounding atmosphere.

It has been a troublesome problem, however, to provide an entirely satisfactory mechanism for measuring the liquid level of carbon dioxide that is confined in large capacity vessels or containers. This is due to the fact that the liquid develops relatively high vapor pressures even when it is maintained at relatively low subatmospheric temperatures. For example, the gauge pressure of liquid carbon dioxide confined at 0° F. is 290 pounds per square inch. This pressure rises to 1436 pounds per square inch when the temperature of the liquid is increased to 86° F.

Attempts have been made to employ float gauges for measuring liquid levels but this type of instrument has not proved to be entirely satisfactory because it is necessary to pass an operating shaft through a wall of the vessel to connect the float, that is located within the vessel to the indicating device, that must be positioned outside of the vessel where it can be viewed by an attendant. This operating shaft must be permitted to rotate freely and yet it must be packed so that no leakage will occur.

Other types of gauges have been tried out which involve the use of a "sight-glass" but these instruments have not proved to be satisfactory because with even moderately high vapor pressures it is impossible to consistently provide and maintain leak-proof joints between the opposite ends of the transparent glass tube and the metal connections which are provided to support the tube and connect it to the interior of the vessel. It is very difficult to seal the packing glands that are provided for the opposite ends of the tube without putting excessive strain on the tube and cracking it. In order to prevent cracking the tube under these conditions, the two packing gland nuts must be perfectly lined up with respect to each other and the tube. However, in spite of careful workmanship quite a number of cases have developed where the tubes have been cracked and where the bottom gland has not been tight enough, thus allowing the gauge liquid to escape.

The primary object of this invention is to provide a liquid level gauge which is entirely satisfactory for use in connection with the storing or transporting of liquid carbon dioxide.

Another important object of the invention is to provide means for connecting the liquid level gauge to a vessel containing liquid carbon dioxide in such a manner that blowing of the gauge liquid from the gauge will be prevented.

A further object of the invention resides in the provision of means for subjecting the liquid column in the gauge to equal pressures at its upper and lower ends for the purpose of checking the accuracy of the zero reading of the gauge.

Other objects and advantages of the invention will be apparent during the course of the following description.

In the accompanying drawings forming a part of this specification and in which like numerals are employed to designate like parts throughout the same, Figure 1 is a view, partly in cross-section, of a liquid storage vessel with a gauge constructed in accordance with the present invention associated therewith, Figure 2 is a front elevational view of the gauge.

Figure 3 is a longitudinal sectional view taken on line 3—3 of Figure 2, and

Figure 4 is a sectional view taken on line 4—4 of Fig. 3.

Figure 1:
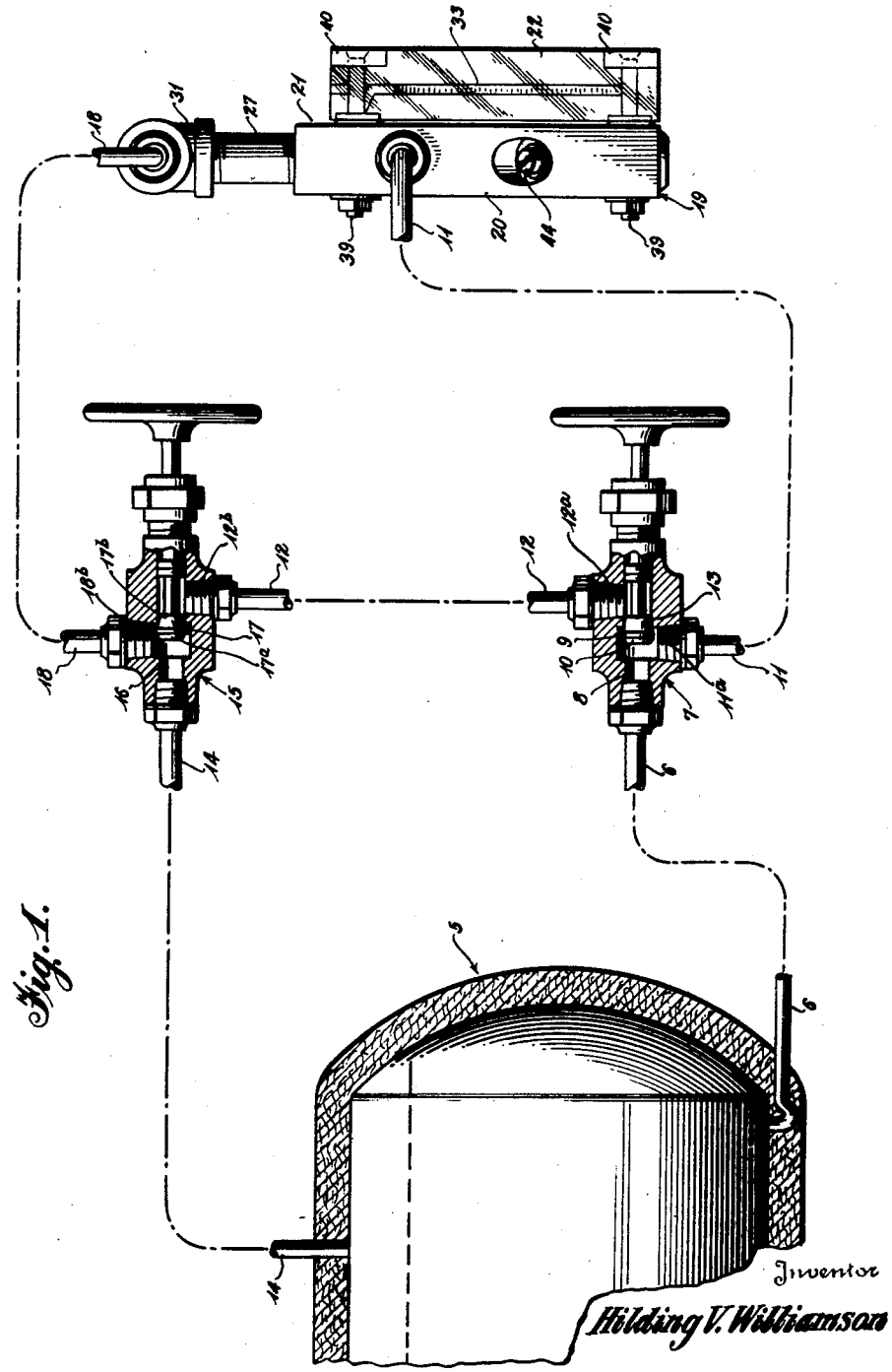

In the drawings, wherein for the purpose of illustration is shown the preferred embodiment of the invention, reference numeral 5 designates a closed vessel for storing liquid carbon dioxide under any desired vapor pressure. In the case of low temperature low pressure storage of carbon dioxide, the vessel 5 will be suitably insulated to reduce the rate of absorption of heat from the atmosphere and may be provided with refrigerating means for maintaining the liquid at a predetermined, constant temperature, and its corresponding vapor pressure. Leading from the bottom of the vessel 5 is a vessel conduit 6 which is connected to the inlet of a multiple outlet valve 7. Because this tank conduit is uninsulated, liquid carbon dioxide entering the same from tank 5 will vaporize. The inlet 8 of this valve 7 is adapted to be closed by a valve member 9 which is provided with a tapered or conical face 10 for this purpose. The outlet 11a of the valve 7 leads to a gauge conduit 11 while the outlet 12a leads to a pressure equalizing pipe 12. The valve member 9 is provided with a back-seating tapered or conical face 13 to close the outlet 12a when the valve is completely open.

A vessel conduit 14 leads from the vapor space in the upper portion of the vessel 5 to the inlet of a multiple outlet valve 15 which is identical in construction to the valve 7. This inlet 16 of the valve 15 is adapted to be closed by the tapered or conical face 17a of the valve member 17. Upon complete opening of the inlet 16 the back-seating tapered or conical face 17b of the valve member 17 closes the valve outlet 12b which communicates with the pressure equalizing pipe 12. The second outlet 18b of the valve 15 communicates with a gauge conduit 18.

The gauge conduits 11 and 18 are connected to the gauge which is designated in its entirety by the reference numeral 19. This gauge comprises a metallic body block 20, provided with a plane front face 21, and a sight block 22 formed of transparent material. The metallic body block 20 is machined to form a baffle and gauge liquid receiving reservoir 23 which is closed at its lower end by a plug 24 welded in place to provide a seal to prevent leakage. A carbon dioxide vapor inlet 25 extends laterally into the metallic body block 20 at a point just above the upper end of the gauge liquid reservoir 23 and communicates therewith through a restricted orifice 25a. The gauge conduit 11 is connected to this inlet 25. The gauge liquid reservoir 23 is provided near its lower end with an opening 26 that passes through the front face 21 of the metallic body block 20.

The upper portion of the metallic body block 20 is recessed for threaded connection with a nipple 27 and there is thus provided a second or upper baffle and gauge liquid receiving reservoir 28. A disc 29, having a restricted central orifice 30 therein, is secured in position above the nipple 27 by means of the elbow coupling 31 which is connected to the gauge conduit 18. The reservoir 28 is tapered at its lower end and communicates with a sloping passage 32 which extends through the front face 21 of the metallic body block 20.

The transparent sight block 22 is preferably constructed of a thermo-plastic material of high compressive strength and a highly satisfactory material for this purpose is sold under the trade name "Lucite." The transparent sight block 22 is drilled to provide a longitudinally extending sight passageway 33, a horizontally extending passageway 34 connected to the lower end of the sight passageway 33, and a sloping passageway 35 connected to the sight passageway 33 near the upper end thereof. The extreme upper end of the sight passageway 33 is closed and sealed by a plug 36 which may be and preferably is of the same plastic material from which the block 22 is made. The passageways 34 and 35 pass through the rear face 37 of the transparent sight block 22 and are so spaced that they will register with the opening 26 and the passage 32 of the lower and upper gauge liquid reservoirs, respectively.

Circular gaskets 38 surround the passageways 34 and 35 and the rear face 37 of the sight block 22 may be recessed slightly to properly position such gaskets. The block 22 is clamped to the block 20 with the passageways 34 and 35 in register with the opening 26 and passage 32 respectively by means of bolts 39, four such bolts being shown. The front face of the sight block 22 is shown as being provided with embedded reinforcing metal bars 40 for holding the heads of the bolts 39 and for distributing the compressive stresses. The bolts 39 extend through the transparent plastic sight block 22 and the metallic body block 20. As is best shown in Figs. 2 and 4, these bolts are so positioned that they do not intercept any of the passageways or reservoirs. The rear ends of the bolts are provided with heavy lock washers 41 and nuts 42. The lock washers 41 should afford a substantial amount of resiliency in order to maintain the gaskets 38 in positive sealing engagement with the two blocks 20 and 22. Heavy compression springs may be substituted for the lock washers 41 if this is found advisable.

Mercury, or other suitable gauge liquid, is introduced into the lower reservoir 23 through the opening 43 which is normally closed and sealed by means of a removable screw plug 44. It will be noted that the opening 43 slopes downwardly which facilitates introduction of the mercury and also permits a medicine dropper to be introduced into the reservoir 23 for withdrawal of mercury.

The gauge is provided with a plate 45 bearing suitably calibrated indicia. This indicia plate may be held in position by any suitable means, such as by the bolts 39. The block 20 is preferably provided with tapped holes 46 for securing it to a suitable mounting bracket.

The operation of this gauge and the mechanism employed for connecting it to an insulated storage vessel for low temperature, low pressure liquid carbon dioxide now will be explained.

In practice, the carbon dioxide storage vessel 5 should not be filled to over six-sevenths of its depth so as to provide at all times a proper vapor space in the upper portion thereof. It was briefly stated above that the withdrawal of liquid carbon dioxide from the insulated vessel 5 into an uninsulated pipe would cause the liquid carbon dioxide to vaporize. Therefore, the conduit 6 which is uninsulated will contain carbon dioxide vapor. Because of this fact, the gauge 19 can be placed at any level and at any distance with respect to the storage vessel 5.

When the gauge is in operation, the valve members 9 and 17 of the valves 7 and 15, respectively, will be back-seated so that the vessel conduit 6 and gauge conduit 11 will be in communication with each other to deliver vapor pressure to the surface of the mercury in the lower gauge reservoir 23 and the upper vessel conduit 14 will be in communication with the upper gauge conduit 18 to apply vapor pressure to the top of the column of mercury in the sight passageway 33. The upper reservoir 28, of course, will be included as a part of the path for the carbon dioxide vapor that is applied to the top of the sight column of mercury. The pressure applied to the surface of the mercury in the lower reservoir 23 will be equal to the vapor pressure that is applied to the surface of the liquid carbon dioxide confined in the storage vessel 5 and the static head of the liquid confined in this vessel. The pressure that is applied to the surface of the sight column of mercury present in the sight passageway 33 will correspond with the vapor pressure that prevails in the vapor space of the storage vessel 5. Since the pressure in the lower reservoir 23, and applied to the mercury positioned therein, is greater than the pressure prevailing in the upper reservoir 28, and applied to the surface of the sight column of mercury present in the passageway 33, the mercury in the sight passageway 33 will rise to a height that is proportional to the depth of the liquid carbon dioxide in the vessel 5. The indicia on the plate 45, therefore, should be suitably calibrated to indicate the depth of liquid in the vessel 5 in any desired units of measurement.

When it is desired to check the accuracy of the gauge; i. e., whether the proper amount of mercury is present therein, this can be accomplished by closing both of the valves 7 and 15. These valves are closed when their members 9 and 17 have their surfaces 10 and 17a, respectively, closing the inlets 8 and 16 of the two valves. When these valves are closed, the pressure equalizing pipe 12 is placed in communication with both of the gauge conduits 11 and 18 and the pressures applied to the surface of the mercury in the lower reservoir 23 and to the surface of the column of mercury in the sight passageway 33 will be equal. The column of mercury in the passageway 33 then should register with the zero or "empty" indicia of the gauge plate 45. If the sight column of mercury in the passageway 33 is above the "empty" line, sufficient mercury should be removed from the reservoir 23 through the opening 43 to correct the height of the sight column. If the mercury in the sight passageway 33 is below the "empty" line, sufficient mercury should be added to the reservoir 23 to bring the sight column of mercury up to this line.

When the supply of carbon dioxide for the vessel 5 is being replenished, the inlets 8 and 16 of the valves 7 and 15, respectively, should either be completely closed by the valve members 9 and 17, so as to disconnect the gauge 19 from the interior of the vessel, or the valve member 9 should be completely closed while valve member 17 may be left in an intermediate position. If the valves 7 and 15 are not properly conditioned to balance the pressures in both of the gauge reservoirs and a pressure surge does occur that would ordinarily force mercury into either of the reservoirs 23 or 28, the restricted orifices 25a and 30 at the tops of these reservoirs will reduce the velocity of the surging action so that there is less chance of any mercury being blown into either of the gauge conduits 11 or 18. Whenever the liquid carbon dioxide stored in the vessel 5 is to be manipulated in any other manner which might cause a surge of pressure to be delivered to either or both of the reservoirs of the gauge, the valves 7 and 15 should be manipulated, or adjusted, so that the pressure equalizing pipe 12 will take care of the surges of pressure, in the manner described above.

By providing a relatively small diameter for the lower gauge reservoir 23 and positioning the sight block 22 in side engagement with the body block 20 so that a short passageway 35 will connect the reservoir 23 with the sight passageway 33, the gauge can be operated entirely satisfactorily with a very small quantity of mercury. It will be apparent, also, that the simplicity of the gauge construction will permit it to be manufactured at a very low cost.

One of the important features of this invention is considered to be the manner in which the plastic sight block 22 is connected to the metallic body block 20 without the formation of any threaded connections in the sight block. This is accomplished by clamping the two blocks and the interposed sealing members together so tightly that the high pressure carbon dioxide vapor will not be permitted to leak at the joints. Attempts have been made to provide leak-proof threaded connections with transparent plastic materials, such as Lucite, but the high pressure tends to cause the material to "cold flow" sufficiently, in time, to permit leaks to develop. Furthermore, Lucite has been found to be stronger in compression than in tension so that clamping the two blocks together takes advantage of this characteristic. Although the clamping bars 40 are disclosed as being embedded in the end portions of the plastic block 20, it will be appreciated that this construction is used primarily because it adds to the appearance of the gauge. The cost of producing the gauge may be reduced still further if the bars are not embedded.

It is to be understood that the form of this invention herewith shown and described is to be taken as a preferred example of the same, and that various changes in the shape, size, and arrangement of parts may be restorted to without departing from the spirit of the invention or the scope of the subjoined claims.

Having thus described the invention. I claim:

1. A gauge for measuring the level of a liquefied gas confined under its own vapor pressure, comprising a storage vessel, separate conduit means connected to the bottom of the liquid space and to the vapor space of said vessel, a multiway valve connected in each of said conduit means, a transparent member having a sight passageway formed therein, a reservoir communicating with the liquid space conduit means and with the lower end of the sight passageway, a body of gauge liquid positioned in said reservoir and the sight passageway, a second reservoir communicating with the vapor space conduit means and with the upper end of the sight passageway, and a pressure equalizing pipe adapted to be connected to the gauge reservoirs and/or the liquid and vapor spaces of the storage vessel by said multi-way valves.

2. A gauge for measuring the level of a liquefied gas confined under its own vapor pressure, comprising a storage vessel, separate conduit means connected to the liquid space and to the vapor space of said vessel, valve means connected in each of said conduit means, a transparent member having a sight passageway formed therein, a reservoir communicating with the liquid space conduit means and with the lower end of the sight passageway, a body of gauge liquid positioned in said reservoir and the sight passageway, means connecting the vapor space conduit means with the upper end of the sigh passageway, and a pressure equalizing pipe connected with both of the valve means for being placed in communication with the ends of the sight passageway and/or the liquid and vapor spaces of the storage vessel.

3. A gauge for measuring the level of a liquefied gas confined under its own vapor pressure, comprising a storage vessel, separate conduit means connected to the bottom of the liquid space and to the vapor space of said vessel, a multi-way valve connected in each of said conduit means, a transparent member having a sight passageway formed therein, a reservoir communicating with the liquid space conduit means and with the lower end of the sight passageway, a body of gauge liquid positioned in said reservoir and the sight passageway, a second reservoir communicating with the vapor space conduit means and with the upper end of the sight passageway, means providing a restricted orifice between each reservoir and the connection with its conduit means, and a pressure equalizing pipe adapted to be connected to the gauge reservoirs and/or the liquid and vapor spaces of the storage vessel by said multi-way valves.

4. A gauge for measuring the level of a liquefied gas confined under its own vapor pressure, comprising a storage vessel, separate conduit means connected to the liquid space and to the vapor space of said vessel, valve means connected in each of said conduit means, a transparent member having a sight passageway formed therein, a reservoir communicating with the liquid space conduit means and with the lower end of the sight passageway, a body of gauge liquid positioned in said reservoir and the sight passageway, means connecting the vapor space conduit means and with the upper end of the sight passageway, means providing a substantial restriction to the flow of gauge liquid into both of the conduit means, and a pressure equalizing pipe connected with both of the valve means for being placed in communication with the ends of the sight passageway and/or the liquid and vapor spaces of the storage vessel.

5. A gauge for measuring the level of a liquefied gas confined under its own vapor pressure, comprising a storage vessel, separate conduit means connected to the bottom of the liquid space and to the vapor space of said vessel, a multi-way valve connected in each of said conduit means, a transparent block having formed therein a sight passageway and transverse passageways connected to the ends of the sight passageway and opening through one side face of said block, a body block, means for clamping said blocks together in side-by-side relation, a reservoir formed in the body block and having a side opening registering with the transverse passageway connected to the lower end of the sight passageway and a top connection with the liquid space conduit means, a body of gauge liquid positioned in said reservoir, a second reservoir formed at the upper end of the body block and having a side opening registering with the transverse passageway connected to the upper end of the sight passageway and a top connection with the vapor space conduit means, and a pressure equalizing pipe adapted to be connected to the gauge reservoirs and/or the liquid and vapor spaces of the storage vessel by said multi-way valves.

6. A gauge for measuring the level of a liquefied gas confined under its own vapor pressure, comprising a storage vessel, separate conduit means connected to the bottom of the liquid space and to the vapor space of said vessel, a multi-way valve connected in each of said conduit means, a transparent block having formed therein a sight passageway and transverse passageways connected to the ends of the sight passageway and opening through one side face of said block, a body block, means for clamping said blocks together in side-by-side relation, a reservoir formed in the body block and having a side opening registering with the transverse passageway connected to the lower end of the sight passageway and a top connection with the liquid space conduit means, a body of gauge liquid positioned in said reservoir, a second reservoir formed at the upper end of the body block and having a side opening registering with the transverse passageway connected to the upper end of the sight passageway and a top connection with the vapor space conduit means, packing means clamped between the transparent block and the body block to prevent leakage where said transverse passageways and side openings register, and a pressure equalizing pipe adapted to be connected to the gauge reservoirs and/or the liquid and vapor spaces of the storage vessel by said multi-way valves.

7. A gauge for measuring the level of a liquefied gas confined under its own vapor pressure, comprising a storage vessel, separate conduit means connected to the bottom of the liquid space and to the vapor space of said vessel, a multi-way valve connected in each of said conduit means, a transparent block having formed therein a sight passageway and transverse passageways connected to the ends of the sight passageway and opening through one side face of said block, a body block, means for clamping said blocks together in side-by-side relation, a reservoir formed in the body block and having a side opening registering with the transverse passageway connected to the lower end of the sight passageway and a top connection with the liquid space conduit means, a body of gauge liquid positioned in said reservoir, a second reservoir formed at the upper end of the body block and having a side opening registering with the transverse passageway connec.ed to the upper end of the sight passageway and a top connection with the vapor space condut means, means providing a restricted orifice at the top of each reservoir, and a pressure equalizing pipe adapted to be connected to the gauge reservoirs and/or the liquid and vapor spaces of the storage vessel by said multi-way valves.

8. A gauge for measuring the level of a liquefied gas confined under its own vapor pressure, comprising a storage vessel, separate conduit means connected to the liquid space and to the vapor space of said vessel, valve means connected in each of said conduit means, a transparent block having formed therein a slight passageway with end portions opening through the exterior of the block, a main body structure, means for clamping the main body structure against the transparent block so as to overlie the exteriorly opening end portions of the sight passageway, a reservoir formed in the main body structure and having an opening registering with the exteriorly opening lower end portion of the sight passageway and a top connection with the liquid space conduit means, a body of gauge liquid positioned in said reservoir, said main body structure providing means for connecting the exteriorly opening upper end portion of the sight passageway with the vapor space conduit means, and a pressure equalizing pipe adapted to be connected to both of the valve means for being placed in communication with both of the exteriorly opening end portions of the sight passageway and/or the liquid and vapor spaces of the storage vessel.

9. A liquid level gauge for a liquefied gas confined under its own vapor pressure, comprising a metallic body block, a sight block formed of transparent material, means for clamping said blocks together in side-by-side relation, said sight block having a longitudinally extending sight passageway formed therein and having end passageways opening through the side face presented to the body block, a reservoir formed in the body block and having a side opening at its lower end communicating with the lower end passageway of the sight block, means formed in the body block for connecting to the upper end of the reservoir a gauge conduit that is subject to the vapor pressure and static head of the liquefied gas, a body of gauge liquid positioned in the reservoir and the passageways of the sight block, said body block having a passage formed therein communicating with the upper end passageway of the sight block, and means formed in the body block for connecting to said passage a gauge conduit that is subject to the vapor pressure of the liquefied gas.

10. A liquid level gauge for a liquefied gas confined under its own vapor pressure, comprising a metallic body block, a sight block formed of transparent material, a metal bar recessed in each end portion of the sight block, bolts seated at one end against the metal bars and passing therethrough and through the two blocks to clamp the blocks together in side-by-side relation, said sight block having a longitudinally extending sight passageway formed therein and having end passageways opening through the side face presented to the body block, a reservoir formed in the body block and having a side opening at its lower end communicating with the lower end passageway of the sight block, means formed in the body block for connecting to the upper end of the reservoir a gauge conduit that is subject to the vapor pressure and static head of the liquefied gas, a body of gauge liquid positioned in the reservoir and the passageways of the sight block, said body block having a passage formed therein communicating with the upper end passageway of the sight block, and means formed in the body block for connecting to said passage a gauge conduit that is subject to the vapor pressure of the liquefied gas.

11. A liquid level gauge for a liquefied gas confined under its own vapor pressure, comprising a metallic body block, a sight block formed of transparent material, means for clamping said blocks together in side-by-side relation, said sight block having a longitudinally extending sight passageway formed therein and having end passageways opening through the side face presented to the body block, a reservoir formed in the body block and having a side opening at its lower end communicating with the lower end passageway of the sight block, means formed in the body block for connecting to the upper end of the reservoir a gauge conduit that is subject to the vapor pressure and static head of the liquefied gas, a body of gauge liquid positioned in the reservoir and the passageways of the sight block, said body block having a passage formed therein communicating with the upper end passageway of the sight block, packing means between the two blocks to prevent leakage where the end passageways of the sight block communicate with the side opening and the passage of the body block, and means formed in the body block for connecting to said passage a gauge conduit that is subject to the vapor pressure of the liquefied gas.

12. A liquid level gauge for a liquefied gas confined under its own vapor pressure, comprising a metallic body block, a sight block formed of transparent material, resilient means for clamping said blocks together in side-by-side relation, said sight block having a longitudinal extending sight passageway formed therein and having end passageways opening through the side face presented to the body block, a reservoir formed in the body block and having a side opening at its lower end communicating with the lower end passageway of the sight block, means formed in the body block for connecting to the upper end of the reservoir a gauge conduit that is subject to the vapor pressure and static head of the liquefied gas, a body of gauge liquid positioned in the reservoir and the passageways of the sight block, said body block having a passage formed therein communicating with the upper end passageway of the sight block, packing means between the two blocks to prevent leakage where the end passageways of the sight block communicate with the side opening and the passage of the body block, and means formed in the body block for connecting to said passage a gauge conduit that is subject to the vapor pressure of the liquefied gas.

13. A liquid level gauge for a liquefied gas confined under its own vapor pressure, comprising a metallic body block, a sight block formed of transparent material, means for clamping said blocks together in side-by-side relation, said sight block having a longitudinally extending sight passageway formed therein and having end passageways opening through the side face presented to the body block, a reservoir formed in the body block and having a side opening at its lower end communicating with the lower end passageway of the sight block, means formed in the body block for connecting to the upper end of the reservoir a gauge conduit that is subject to the vapor pressure and static head of the liquefied gas, a body of gauge liquid positioned in the reservoir and the passageways of the sight block, means for providing the body block with a second reservoir, said body block having a passage formed therein connecting the lower end of the second reservoir with the upper end passageway of the sight block, and means for connecting the upper end of the second reservoir with a gauge conduit that is subject to the vapor pressure of the liquefied gas.

14. A liquid level gauge for a liquefied gas confined under its own vapor pressure, comprising a metallic body block, a sight block formed of transparent material, a metal bar at each end portion of the sight block, means to clamp the blocks and the metal bars together, said sight block having a longitudinally extending sight passageway formed therein and having end passageways opening toward the body block, a reservoir formed in the body block and having an opening at its lower end communicating with the lower end passageway of the sight block, means formed in the body block for connecting to the upper end of the reservoir a gauge conduit that is subject to the vapor pressure and static head of the liquefied gas, a body of gauge liquid positioned in the reservoir and passageways of the sight block, means for providing the body block with a second reservoir, said body block having a passage formed therein connecting the lower end of the second reservoir with the upper end passageway of the sight block, and means for connecting the upper end of the second reservoir with a gauge conduit that is subject to the vapor pressure of the liquefied gas.

15. A liquid level gauge for a liquefied gas confined under its own vapor pressure, comprising a metallic body block, a sight block formed of transparent thermo-plastic material, means for clamping the blocks together in side-by-side relation, a calibrated gauge plate held between said blocks and viewed through the sight block, said sight block having a passageway for a column of gauge liquid formed therein in operative relation to the calibrations of the gauge plate, a reservoir for the gauge liquid formed in the body block and communicating with the lower end of the passageway formed in the sight block, means for connecting to the reservoir a gauge conduit that is subject to the vapor pressure and static head of the liquefied gas, and means for connecting to the upper end of the passageway formed in the sight block a gauge conduit that is subject to the vapor pressure of the liquefied gas.

16. A liquid level gauge for a liquefied gas confined under its own vapor pressure, comprising a metallic body block, a sight block formed of transparent thermo-plastic material, means for clamping the blocks together in side-by-side relation, a calibrated gauge plate held between said blocks and viewed through the sight block, said sight block having a passageway for a column of gauge liquid formed therein in operative relation to the calibrations of the gauge plate, a reservoir for the gauge liquid formed in the body block and communicating with the lower end of the passageway formed in the sight block, means for providing the body block with a second reservoir, said body block having a passage formed therein connecting the lower end of the second reservoir with the upper end passageway of the sight block, and means for connecting the upper end of the second reservoir with a gauge conduit that is subject to the vapor pressure of the liquefied gas.

17. A liquid level gauge for a liquefied gas confined under its own vapor pressure, comprising a metallic body block, a sight block formed of transparent thermo-plastic material, reinforcing means recessed in the end portions of the sight block, means operatively associated with said reinforcing means for resiliently clamping the blocks together in side-by-side relation, a calibrated gauge plate held between said blocks and viewed through the sight block, said sight block having a passageway for a column of gauge liquid formed therein in operative relation to the calibrations of the gauge plate, a reservoir for the gauge liquid formed in the body block and communicating with the lower end of the passageway formed in the sight block, means for connecting to the reservoir a gauge conduit that is subject to the vapor pressure and static head of the liquefied gas, and means for connecting to the upper end of the passageway formed in the sight block a gauge conduit that is subject to the vapor pressure of the liquefied gas.

18. A liquid level gauge for a liquefied gas confined under its own vapor pressure, comprising a metallic body block, a sight block formed of transparent thermo-plastic material, a calibrated gauge plate, means for clamping the blocks and the calibrated gauge plate together said sight block having a passageway for a column of gauge liquid formed therein in operative relation to the calibrations of the gauge plate, and means formed in the body block for connecting the opposite ends of the passageway of the sight block to gauge conduits that are subject to the vapor pressure and static head of the liquefied gas and to the vapor pressure of the liquefied gas, respectively.

19. A liquid level gauge for a liquefied gas confined under its own vapor pressure, comprising a main body structure, a sight member formed of transparent material, means for clamping said main body structure and sight member together, said sight member having a longitudinally extending sight passageway formed therein having end portions opening through the exterior thereof and presented to the main body structure, a reservoir formed in the main body structure and having an opening at its lower end communicating with the lower end portion of the passageway of the sight member, means provided by the main body structure for connecting to the upper end of the reservoir a gauge conduit that is subject to the vapor pressure and static head of the liquefied gas, a body of gauge liquid positioned in the reservoir and the passageway of the sight member, said main body structure having means for connecting the upper end portion of the sight passageway to a gauge conduit that is subject to the vapor pressure of the liquefied gas, and means providing a substantial restriction to the flow of gauge liquid out of the upper end of the reservoir and through the means for connecting the upper end portion of the sight passageway to a gauge conduit.

20. A liquid level gauge for a liquefied gas confined under its own vapor pressure, comprising a main body structure, a sight member formed of transparent thermo-plastic material, means for connecting the main body structure and the sight member together, said sight member having a passageway for a column of gauge liquid formed therein, and means provided by the main body structure for connecting the opposite ends of the passageway of the sight member to gauge conduits that are subject to the vapor pressure and static head of the liquefied gas and to the vapor pressure of the liquefied gas, respectively.

HILDING V. WILLIAMSON.

CERTIFICATE OF CORRECTION.

Patent No. 2,361,440.  October 31, 1944.

HILDING V. WILLIAMSON.

It is hereby certified that error appears in the printed specification of the above numbered patent requiring correction as follows: Page 3, second column, line 21, before the word "positioning" insert --by--; line 58, for "restorted" read --resorted--; page 4, first column, line 17, claim 2, for "sigh" read --sight--; line 55, claim 4, after "means" strike out "and"; page 5, second column, line 25, claim 12, for "longitudinal" read --longitudinally--; and that the said Letters Patent should be read with this correction therein that the same may conform to the record of the case in the Patent Office.

Signed and sealed this 12th day of June, A. D. 1945.

(Seal)

Leslie Frazer
Acting Commissioner of Patents.